(12) United States Patent
Uczulko et al.

(10) Patent No.: US 12,370,911 B2
(45) Date of Patent: Jul. 29, 2025

(54) RESONATOR CIRCUIT FOR A CONTACTLESS ENERGY TRANSMISSION SYSTEM FOR CHARGING ELECTRIC VEHICLES, AND CONTACTLESS ENERGY TRANSMISSION SYSTEM FOR CHARGING ELECTRIC VEHICLES

(71) Applicant: SUMIDA COMPONENTS & MODULES GMBH, Obernzell (DE)

(72) Inventors: Marco Uczulko, Deggendorf (DE); Philemon Wrensch, Passau (DE)

(73) Assignee: SUMIDA COMPONENTS & MODULES GMBH, Obernzell (DE)

( * ) Notice: Subject to any disclaimer, the term of this patent is extended or adjusted under 35 U.S.C. 154(b) by 597 days.

(21) Appl. No.: 17/794,063

(22) PCT Filed: Jan. 20, 2021

(86) PCT No.: PCT/EP2021/051172
§ 371 (c)(1),
(2) Date: Jul. 20, 2022

(87) PCT Pub. No.: WO2021/148453
PCT Pub. Date: Jul. 29, 2021

(65) Prior Publication Data
US 2023/0059317 A1    Feb. 23, 2023

(30) Foreign Application Priority Data
Jan. 20, 2020   (DE) .................. 102020200579.6

(51) Int. Cl.
*B60L 53/122*     (2019.01)
*H01F 27/00*      (2006.01)
(Continued)

(52) U.S. Cl.
CPC .......... *B60L 53/122* (2019.02); *H01F 27/006* (2013.01); *H02J 50/12* (2016.02);
(Continued)

(58) Field of Classification Search
CPC ........ B60L 53/122; B60L 53/22; B60L 53/39; H01F 27/006; H01F 3/10; H01F 27/38;
(Continued)

(56) References Cited

U.S. PATENT DOCUMENTS 6,252,386 B1    6/2001   Minami et al.
8,810,205 B2 *  8/2014   Ichikawa .............. B60L 53/122
                                                   320/104
(Continued)

FOREIGN PATENT DOCUMENTS

CN     105958555 A     9/2016
CN     107276247 A    10/2017
(Continued)

OTHER PUBLICATIONS

International Search Report for Application No. PCT/EP2021/051172, dated Apr. 26, 2021, 5 Pages (including English translation).
(Continued)

*Primary Examiner* — Paul Dinh
(74) *Attorney, Agent, or Firm* — BROOKS KUSHMAN P.C.

(57) ABSTRACT

A resonator circuit for a contactless energy transmission system for charging electric vehicles and a contactless energy transmission system for charging electric vehicles are described. The resonator circuit may include first and second terminals, multiple windings, and first and second switching elements. The windings may be divided into first and second groups. A connection node may be arranged between the first and second groups of windings and con-
(Continued)

nected via the first switching element to the first terminal, and the connection node is connected via the first group of windings to the second terminal. The second switching element may be arranged between the second group of windings and the first terminal. The first connection node may be formed in a star-shaped manner between the first group of windings, the second group of windings, and the first switching element.

20 Claims, 10 Drawing Sheets

(51) Int. Cl.
*H02J 50/12* (2016.01)
*H02J 50/40* (2016.01)
*H04B 5/79* (2024.01)

(52) U.S. Cl.
CPC .............. *H02J 50/402* (2020.01); *H04B 5/79* (2024.01); *B60Y 2200/91* (2013.01)

(58) Field of Classification Search
CPC ......... H01F 38/14; H02J 50/12; H02J 50/402; H02J 7/00034; H02J 50/80; H02J 2310/48; H04B 5/79; H04B 5/263; B60Y 2200/91; H02M 3/015; Y02T 10/70; Y02T 10/7072; Y02T 90/12; Y02T 90/14
USPC ........................................................ 320/104
See application file for complete search history.

(56) References Cited

U.S. PATENT DOCUMENTS

| | | |
|---|---|---|
| 9,787,141 B2 | 10/2017 | Karalis et al. |
| 2015/0094887 A1* | 4/2015 | Kawashima ............ H02J 50/12 320/108 |
| 2016/0257209 A1 | 9/2016 | Lewis |
| 2017/0288463 A1 | 10/2017 | Nakahara et al. |
| 2019/0252923 A1 | 8/2019 | Hemphill et al. |
| 2021/0110960 A1 | 4/2021 | Weber et al. |

FOREIGN PATENT DOCUMENTS

| | | |
|---|---|---|
| DE | 102015208936 A1 | 9/2016 |
| DE | 102017205215 A1 | 10/2017 |
| EP | 3545537 A1 | 10/2019 |
| WO | 2016114893 A1 | 7/2016 |

OTHER PUBLICATIONS

Office Action for German Patent Application No. 10 2020 200 579.6, dated Sep. 26, 2023, 14 Pages (including English machine translation).
Office Action for Japanese Patent Application No. 2022-543657, dispatch date Jul. 25, 2023, 12 Pages (including English translation).
CNIPA First Office Action in CN Application No. 202180009890.0 dated Jan. 21, 2025 (11 pages, including English translation).
International Search Report, English Translation.

* cited by examiner

RESONATOR CIRCUIT FOR A CONTACTLESS ENERGY TRANSMISSION SYSTEM FOR CHARGING ELECTRIC VEHICLES, AND CONTACTLESS ENERGY TRANSMISSION SYSTEM FOR CHARGING ELECTRIC VEHICLES

CROSS-REFERENCE TO RELATED APPLICATIONS

This application is a U.S. national phase of PCT Application No. PCT/EP2021/051172 filed Jan. 20, 2021, which claims priority to German Application No. DE 10 2020 200 579.6 filed Jan. 20, 2020, the disclosures of which are incorporated in their entireties by reference herein.

TECHNICAL FIELD

The present disclosure relates to a resonator circuit for a contactless energy transmission system for charging electric vehicles, in particular for charging a drive battery or traction battery of an electric vehicle, and to a contactless energy transmission system for charging electric vehicles.

BACKGROUND

Due to the increasing share of electric power that is generated from renewable energy sources and far-reaching international treaties to reduce greenhouse gases, electric motor vehicles, i.e., motor vehicles with an electric drive, become increasingly important. Electric cars are examples of electric motor vehicles which further comprise passenger vehicles and freight vehicles, such as subway trains, bicycles with an electric drive and the like. In general, an electric car is understood to be a motor vehicle for carrying passengers with at least four wheels which is driven by an electric motor as a so-called electric drive and which stores the electrical energy necessary for its locomotion in a traction battery composed of several interconnected battery cells or cell blocks. Since these vehicles themselves do not emit relevant pollutants during operation, they are classified as being emissions-free vehicles as compared to fuel-driven vehicles.

Although electronically controlled electric motors deliver the maximum torque already at a standstill and, a manual transmission is therefore usually not required unlike with a drive using internal combustion engines, and electric motors are quieter and almost free of vibrations during operation as compared to internal combustion engines without directly emitting harmful exhaust gases, the comparatively underdeveloped and non-uniformly regulated charging infrastructure and the resulting low level of flexibility for users of electric vehicles in spontaneously managing longer journeys represents an obstacle to market acceptance.

A further significant difference between electric and fuel-driven vehicles is the comparison of charging times to fueling times for topping up the energy storage. For example, a few minutes of fueling time there presently faces several tens of minutes (currently about 30 minutes for an 80% battery charge at high-performance DC charging stations) for charging drive batteries or traction batteries of electric vehicles.

However, although all charging systems are based on one standard in terms of charging electric vehicles, different types of charging plugs, which were created specifically for electric vehicles, do exist. As a result, there are currently various charging options available, which, however, are heavily dependent on the manufacturer and the model.

Compared with fuel-powered vehicles, it is possible to advantageously arrange an "electricity filling station" or charging station advantageously in locations where many vehicles are accommodated even when not in use, such as a garage or permanently assigned parking spaces or company parking lots for company vehicles. Although almost all electric cars can be charged at any normal domestic outlet, a domestic standard single-phase plug connection with a fuse of 16 A that is typical in households, however, allows for a maximum transmission of 3.6 kW (16 A*230V=3680 W), so that charging an electric car at the domestic outlet would generally take several hours. Furthermore, when charging at the domestic outlet, it is also to be observed that other consumers are possibly already connected to the circuit in the electric circuit of the domestic outlet and that limitations arise for a continued load on the mains power supply at the domestic outlet, in particular for several hours, for charging an electric car.

It does not seem unreasonable to assume that an increase in the acceptance of electric cars is linked, inter alia, to an increase in electromobility and that the improvement in user convenience for electric vehicles can there have a major impact.

One approach to the improvement provides e.g., contactless charging without open contacts in which energy is transmitted in a contactless manner to the car when driven or parked by way of induction for charging the rechargeable batteries on board the electric vehicle. Opportunities to increase market acceptance arise since handling plugs and charging cables by the user is eliminated.

A contactless charging system for electric cars generally comprises a primary resonator device configured to output electrical energy and a secondary resonator device configured to receive the electrical energy that is output from the primary resonator device.

In the case of wireless energy transmission, there are fundamentally two principles that differ in their physical properties: Firstly, wireless energy transmission in the near field, also referred to as a non-radiative coupling. This includes e.g., the inductive coupling based on the magnetic flux that is generated in the primary resonator device and detected by the secondary resonator device. Secondly, transmission of energy in the far field, also referred to as radiative energy transmission, which is based on electromagnetic waves.

Wireless energy transmission in the near field (see above, firstly) is limited in terms of the reach of energy transmission to distances that are close compared to the wavelength of the energy-transmitting radiation.

Energy transmission in the far field is limited to the transmission of a comparatively small output, since the so-called free-space path loss (i.e., the reduction of power density in the propagation of electromagnetic waves in free space without interference from additional damping media or interference from reflection) allows for only a very low degree of efficiency of less than 1%.

For contactless charging of electric vehicles, current charging systems are therefore geared toward the near field transmission of electromagnetic energy by largely inductive coupling, in which a primary coil or transmitting coil is embedded in the ground, e.g., pavement or parking lot, while a secondary coil or receiving coil is attached to the electric vehicle, for example, to the underbody. Mounting above ground is also possible in the private sector, where the primary or transmitting coil protrudes at least in part from the ground.

Known coil configurations for primary and/or secondary coils shall be described below with reference to FIGS. 1A, 1B and 1C.

FIG. 1A schematically shows a top view onto a coil $1a$ having a so-called "double-D coil design". A winding $5a$ is there disposed on a magnetic core $3a$ according to the configuration illustrated, in particular, the individual turns of winding $5a$ do not run around magnetic core $3a$.

FIG. 1B schematically shows a coil $1b$ having a so-called "solenoid coil design", according to which a winding $5b$ is arranged over a magnetic core $3b$ so that the individual turns of winding $5b$ run around magnetic core $3b$.

A device for wireless charging of electric vehicles is described, for example, in document WO 2016/114893 A1.

A contactless power transmission device is known from document DE 10 2017 205 215 A1.

In view of an improvement in electromobility, it is in general an object to provide a specific coil design for inductively charging an electric vehicle, e.g., an electric car, where improved output power, for example, above 7 kW, can be transmitted at an improved degree of efficiency, while maintaining a compact design at the same time. Furthermore, one object is to provide a coil design which at least reduces self-heating due to thermal dissipation loss.

In the development of charging systems, framework conditions are generally to be complied with regarding other aspects, such as e.g., available installation space, predetermined minimum efficiency, predetermined minimum transmission power, predetermined minimum electric strength, requirements in terms of stability, etc.

FIG. 1C schematically shows a known system 10 for contactless charging of an electric car. System 10 comprises a primary resonator device 13 on the ground side with a winding 14 and a secondary resonator device 15 on the vehicle side. Winding 14 is formed according to the double-D configuration illustrated in FIG. 1A. A Cartesian coordinate system x, y, z designates an orientation in space.

10 kW of power is required to be transmitted in known systems in order to obtain sufficient charging power for drive batteries or traction batteries. However, optimal energy transmission occurs only with an optimal arrangement of secondary resonator device 15 relative to primary resonator device 13 on the ground side. An optimal arrangement of secondary resonator device 15 relative to primary resonator device 13 is often not ensured, since an arrangement of secondary resonator device 15 depends on a parking position of an electric car relative to primary resonator device 15. An offset of secondary resonator device 15 in a current parking position relative to an optimal arrangement position of the secondary resonator device 15 is typically to be assumed there, for example, an offset Vx along an x direction and/or an offset Vy along a y direction. Offset Vx and/or offset Vy relative to an optimal arrangement of secondary resonator device 15 with respect to primary resonator device 13 on the ground side result in less of a coupling between primary resonator device 13 and secondary resonator device 15, thereby impairing the efficiency of the energy transmission.

System 10 can further have an offset Vz depending on a vehicle class of an electric car to be charged since a relative height (i.e., distance along a z-direction) between primary resonator device 13 and secondary resonator device 15 depends on the vehicle class of electric cars. System 10 is designed for a specific height between primary resonator device 13 and secondary resonator device 15, i.e., an operating frequency of system 10 (i.e., a frequency at which the system 10 for contactless charging an electric car is operated) at the specific height between primary resonator device 13 and secondary resonator device 15 is equal to a resonance frequency of the arrangement of primary resonator device 13 and secondary resonator device 15. If an electric car is now charged in which secondary resonator device 15 on the vehicle side is arranged at an offset Vz relative to the specific height at which resonance means optimal energy transmission, then system 10 is not in resonance at the operating frequency.

It is an object to design a system that can also operate resonantly and with good efficiency while having an offset. Different load requirements have to be observed without the resonators, inductances, and capacitors used overheating and the energy source not being overloaded.

FIG. 1D shows a schematic circuit diagram of system 10 from FIG. 1C. Primary resonator device 13 there comprises an input filter $13a$ with inductances L1, L2 and a capacitor C1 and a primary resonator $13b$ with an inductance L3 and a compensation capacitor C2 connected in series. Secondary resonator device 15 comprises a secondary resonator $15a$ with an inductance L4 and, connected in series, a compensation capacitor C3, a rectifier $15b$ with diodes D1 to D4 and a drive battery $15c$ of an electric vehicle (not shown) to be charged, which is represented by a battery resistance R1 and a battery capacitance C4. A coupling to a power supply (not shown) is provided at the input filter.

FIG. 1E shows a simplified equivalent circuit diagram of the circuit diagram from FIG. 1D. The inductive coupling between primary resonator device 13 and secondary resonator device 15 is shown in the simplified equivalent circuit diagram of FIG. 1E by a coupled resonant circuit $13c$, where a mutual inductance M illustrates a coupling, in particular mutual inductance M is proportional to a coupling k of primary resonator device 13 and secondary resonator device 15. A total impedance derived from the equivalent circuit diagram in FIG. 1D is there indirectly proportional to $M^2$. Assuming that inductances L3-M and L4-M in FIG. 1E are approximately independent of coupling k, a proportionality between mutual inductance M and coupling k can be assumed. The total impedance derived from the equivalent circuit diagram in FIG. 1E is therefore also indirectly proportional to $k^2$. This in turn means that, given the same power consumption, a current drawn from an energy supply (not shown) increases. The ratio of current and voltage is strongly dependent on the coupling; in particular, a large input voltage of system 10 in FIG. 1C is required for a low coupling and a very large current flow arises with a large coupling. Since the total impedance of system 10 in FIG. 1C is proportional to the effective inductance of input filter $13a$, a large total impedance is therefore introduced through input filter $13a$ and thereby causes current limitation, which is advantageous when the coupling is large.

Since a ratio of the thermal dissipation loss in input filter $13a$ relative to the output power of the resonators is proportional to $M^2$ (i.e., to $k^2$), the ratio between the power loss in input filter $13a$ and the output power increases extremely when the coupling is large. In order to achieve a desired output power, a very large input current is required, with also gives rise to severe losses in efficiency.

It turns out that the change in mutual inductance M of system 10 in FIG. 1C has a very strong influence on the required input voltages of system 10 in FIG. 1C. When there is an offset, there are large variances of the mutual inductance, as shall now be illustrated with reference to FIG. 1F.

FIG. 1F graphically represents results of a comparative measurement performed by the inventors. A left-hand ordinate represents a dependence of the inductances of the primary and secondary resonators on coupling k with reference to the ordinate. A dependence of mutual inductance M on coupling k is illustrated with reference to the right-hand ordinate in FIG. 1F. It turns out that mutual inductance M varies over a wide range with changes of coupling k. It is therefore not possible in system 10 from FIG. 1C to cover the entire working range due to the strong change in mutual inductance M, if system 10 in FIG. 1D is to be operated efficiently at the same time.

In view of the above explanations, it is an object to compensate for a possible offset without sacrificing the efficiency of energy transmission without making major changes to the circuit structure.

SUMMARY

The foregoing problems and objects are satisfied within the scope of the present disclosure by a resonator circuit for a contactless energy transmission system for charging electric vehicles, and by a contactless energy transmission system for charging electric vehicles.

In a first aspect, the disclosure provides a resonator circuit for a contactless energy transmission system for charging electric vehicles. In illustrative embodiments, the resonator circuit comprises a first terminal and a second terminal, a plurality of windings, a plurality of capacitors, a first switching element and a second switching element. The resonator circuit can be connected via the first terminal and the second terminal to a supply circuit or a rectifier. Accordingly, the resonator circuit can be used in a primary resonator device when the resonator circuit is connected to the supply circuit that supplies the contactless energy transmission system with energy, so that energy can be transmitted contactless from the primary resonator device to a secondary resonator device, or can be used in the secondary resonator device when the resonator circuit is connected to the load which represents at least one battery device to be charged by the contactless energy transmission system, in particular a drive battery or a traction battery of an electric vehicle to be charged.

The plurality of windings is divided into a first group of windings and a second group of windings. According to some illustrative embodiments herein, at least one capacitor from the plurality of capacitors, which is connected in series with the associated group of windings, can therefore be associated with each group of windings A resonance of the resonator circuit can be set to a specific resonance frequency by the capacitors associated with each group, where each capacitor with the associated group of windings by itself sets a specific resonance frequency associated with the group.

Furthermore, a first connection node is arranged between the first group of windings and the second group of windings and is respectively arranged between two from the first group of windings, the second group of windings, and the first switching element, and is connected via the first group of windings to the first terminal so that the first connection node is formed in a star-shaped manner. Each of the groups of windings, the second group of windings, and the first switching element can there be connected directly to the first connection node, in particular without a further element between the first connection node and each one of the first group of windings, the second group of windings, and the first switching element. The first and second switching elements make it possible to switch off the first and second group of windings. For example, the first and the second group of windings can be switched off or the windings of the second group can be eliminated from a series connection of the first group and the second group of windings. The windings of the second group continue to be connected to the circuit at the first connection point so that the second group of windings has a defined potential despite being switched off by the second switching element opening and damage caused by potential differences can be prevented. In illustrative examples herein, the first and the second group of windings can be connected directly to the first connection node, where no further element is arranged between the first connection node of each of the groups of windings so that a defined electrical potential is always applied to each of the groups of windings. In illustrative embodiments, each of the groups of windings can be disposed between the associated capacitor and the first connection node.

In some illustrative embodiments of the first aspect, the resonator circuit can further comprise a third group of windings and a third switching element connected in series therewith, where the third group of windings and the third switching element connected in series therewith are connected in parallel with the second group of windings to the first connection node. The series connection composed of the third group of windings and the third switching element allows for a further adjustment option for the resonant circuit. According to illustrative embodiments, the first connection node is formed in a star-shaped manner with at least three legs or rays. Each of the groups of windings can there be connected directly to the first connection node, in particular without a further element between the first connection node and each of the group of windings.

Arranged between the first switching element and the second switching element in some illustrative embodiments of the first aspect can be a second connection node via which the respective first switching element and the second switching element are connected to the first terminal, where the second connection node is formed in a star-shaped manner between the first switching element, the second switching element, and the first terminal. The resonator circuit can also comprise a further circuit section with a fourth group of windings and a fourth switching element connected in series thereto, where the further circuit section is connected parallel to the second group of windings to the second connection node. Furthermore, the second connection node can also be formed in a star-shaped manner between the first switching element, the second switching element, and the first terminal, and the circuit section between the first connection node and the second connection node can be connected in parallel with the second group and the first switching element connected thereto in series. The second connection node is there provided as a common low end for the groups of windings connected in parallel which can be selectively isolated from the second group of windings by the second switching element while it is galvanically connected to the first terminal. According to illustrative embodiments, the second connection node is formed in a star-shaped manner with at least three legs or rays. Each of the groups of windings can be connected to the second connection node only via a switching element arranged therebetween, in particular, an associated one of the switching elements is arranged between the second connection node and each group of windings. In some illustrative examples herein, the second switching element can be arranged between the second connection node and the second group of windings, where the first switching element is arranged between the first connection node and the second connection node such that the first switching element is connected in parallel with the second group of windings and the second switching element. In other words, the first switching element is disposed in a first circuit section between the first connection node and the second connection node, where the second group of windings and the second switching element are disposed in a second circuit section that is connected in parallel with the first circuit section. The first and second circuit sections are each connected in series with the first group of windings and the first connection node.

In some illustrative embodiments of the first aspect, the two switching elements can be configured such that the second switching element is open as long as the first switching element is closed and the second switching element is closed only when the first switching element is open. According to this configuration, advantageous modes of operation are realized, according to which the turns of the second group of windings can be selectively switched on or switched off so that the number of turns in the resonator circuit can be switched over between the number of turns of the first group or the total number of turns of the plurality of windings.

In some illustrative embodiments of the first aspect, the plurality of windings can be provided as a hybrid double-D solenoid coil over a plate-shaped ferrite core. In this case, a coil structure based on a hybrid double-D solenoid coil allows for a relatively large coupling for a large distance and/or offset of the primary and the secondary resonator devices relative to one another.

In some illustrative embodiments of the first aspect, the first group of windings can be formed from two electrically identical winding packages connected in parallel. The current and voltage values of the winding packages connected in parallel in electrically identical winding packages are identical, and equalizing currents between the winding packages connected in parallel are prevented. The current carrying capacity of the first winding packages can be increased by using winding packages connected in parallel.

In some illustrative embodiments of the first aspect, the second group of windings can be formed from two electrically identical winding packages connected in parallel. The use of winding packages connected in parallel allows for induced voltages in the unused turns of the switched-off windings of the second group of windings to be eliminated in part or entirely. The use of winding packages connected in parallel can also increase the current-carrying capacity of the second group of windings.

In some illustrative embodiments of the first aspect, the first group of windings can have a first number of turns from a range of 5 to 20 turns and the second group of windings can have a second number of turns from a range of 1 to 10 turns, where the first number of turns is greater than the second number of turns. This enables a compact resonator circuit with advantageous energy transmission efficiency.

In a second aspect, a contactless energy transmission system for charging electric vehicles is provided with a primary resonator device and a secondary resonator device, where at least one of the primary resonator devices and the secondary resonator device comprises a resonator circuit according to the resonator circuit of the first aspect.

In some illustrative embodiments of the second aspect, the second group of windings can be formed from two electrically identical winding packages connected in parallel and each of the winding packages connected in parallel of the second group of windings can each be connected in series with an associated additional capacitor. Furthermore, the additional capacitors associated with the winding packages of the second group of windings can be configured such that the interconnection of the parallel winding packages of the second group with the associated additional capacitors has a resonance frequency that is greater than an operating frequency of the contactless energy transmission system, while a resonance frequency of the resonator circuit for a series connection of the first and the second group of windings with the associated capacitors has a resonance frequency which is substantially equal to the operating frequency of the contactless energy transmission system. What is thus achieved is that the impedance of the switched-off turns of the second group of windings is high and equalization currents are suppressed. Furthermore, when the second switching element is open, the parallel connection of the winding packages of the second group of windings turns into a series connection in which the winding packages of the second group of windings are switched antiparallel to one another. This ensures that the voltages induced in the turns of the second group of windings cancel out. In each operating mode of the resonator circuit, it is achieved that the resonator circuit is kept in resonance at the operating frequency of the contactless energy transmission system. For example, the operating frequency of the contactless energy transmission system can be in a range from 80 to 90 kHz, in which good energy transmission efficiency can be obtained. According to further examples, the resonance frequency of the interconnection of the parallel winding packages of the second group with the associated additional capacitors can be greater than 90 kHz, so that the resonance frequency of the interconnection of the parallel winding packages of the second group with the associated additional capacitors is sufficiently distant from the operating frequency of the contactless energy transmission system.

In the exemplary embodiments of the second aspect described above, the resonator circuit can be configured as a primary resonator device and/or secondary resonator device in the contactless energy transmission system, whereby an advantageous primary charging system and/or secondary charging system for charging a traction battery of an electric vehicle is provided.

In the aspects described above, the mutual inductance is adjusted while a resonance behavior of the resonator circuit, in particular a resonance frequency thereof, is not changed or is substantially not changed. Regardless of the switching configuration of the switching elements, the windings remain magnetically in the system.

In the embodiments presented above and below, a connection node represents a defined node at which a plurality of lines is connected.

BRIEF DESCRIPTION OF DRAWINGS

Further advantages and illustrative embodiments of the aspects of the disclosure illustrated above shall be described below with reference to the accompanying figures, in which.

DETAILED DESCRIPTION

Figure 1A:
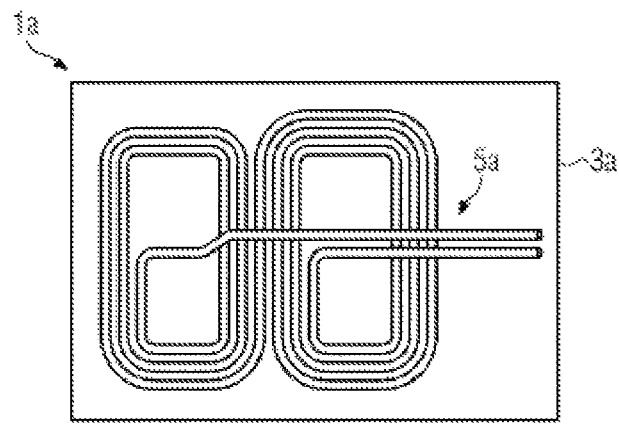
FIGS. 1A to 1B schematically illustrate known coil designs.
Figure 1B:
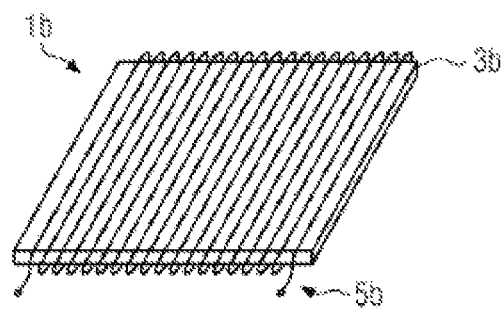
Figure 2:
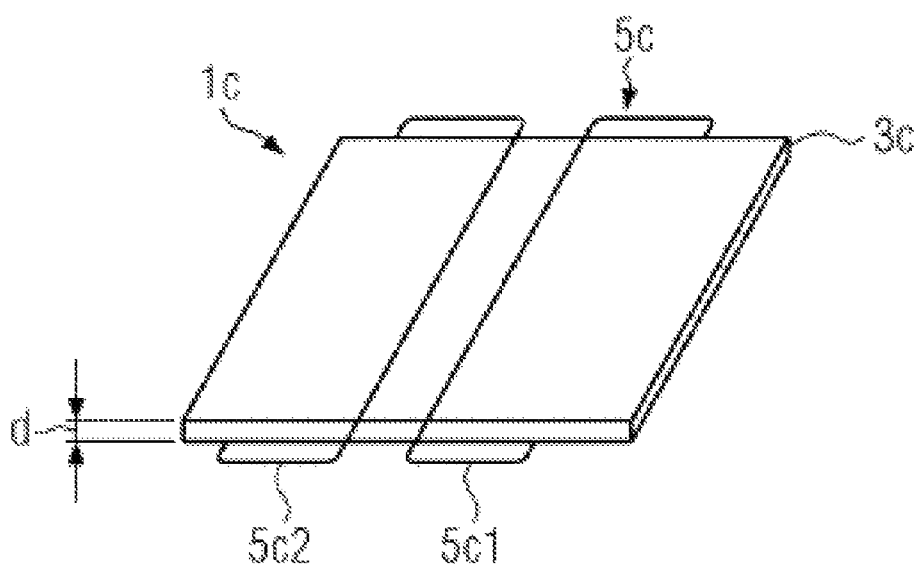
FIG. 2 schematically shows a coil according to a so-called "hybrid double-D solenoid coil design"

FIG. 2 schematically illustrates a coil $1c$ according to a so-called "hybrid double-D solenoid coil design". The coil design of coil $1c$ illustrated represents a hybrid between a double-D coil design (cf. the double-D coil design as illustrated in FIG. 1A) and a solenoid coil design (cf. the solenoid coil design as illustrated in FIG. 1B).

According to the schematic representation in FIG. 2, coil $1c$ there comprises a winding $5c$ over a magnetic core $3c$, comprising a turn $5c1$ and a further turn $5c2$, where turns $5c1$ and $5c2$ are wound at an angle relative to magnetic core $3c$. This means that a turn axis of each of turns $5c1$, $5c2$, i.e., an axis perpendicular to a plane in which turns $5c1$ and $5c2$ are disposed, respectively deviates by less than 45° from a direction along a thickness d. Compared to the solenoid coil design shown in FIG. 1B, it can be seen that a winding axis of winding $5b$ is oriented substantially perpendicular to a direction along a thickness of magnetic core $3b$ ("d" in FIG. 2 was accordingly also to be defined for FIG. 1B), in particular the winding axis of winding $5b$, i.e., an axis perpendicular to a plane in which the turns of windings $5b$ are disposed, is oriented at an angle of more than 45° relative to the direction along the thickness of magnetic core $3b$.

An inductive component 100 for a system for contactless charging according to various illustrative embodiments of the present disclosure shall be described in detail hereafter with reference to FIGS. 3A to 3D, where inductive component 100 is formed in correspondence to the so-called "hybrid double-D-solenoid coil design". Inductive component 100 can represent an illustrative embodiment for a contactless energy transmission system according to the disclosure.

Figure 3A:
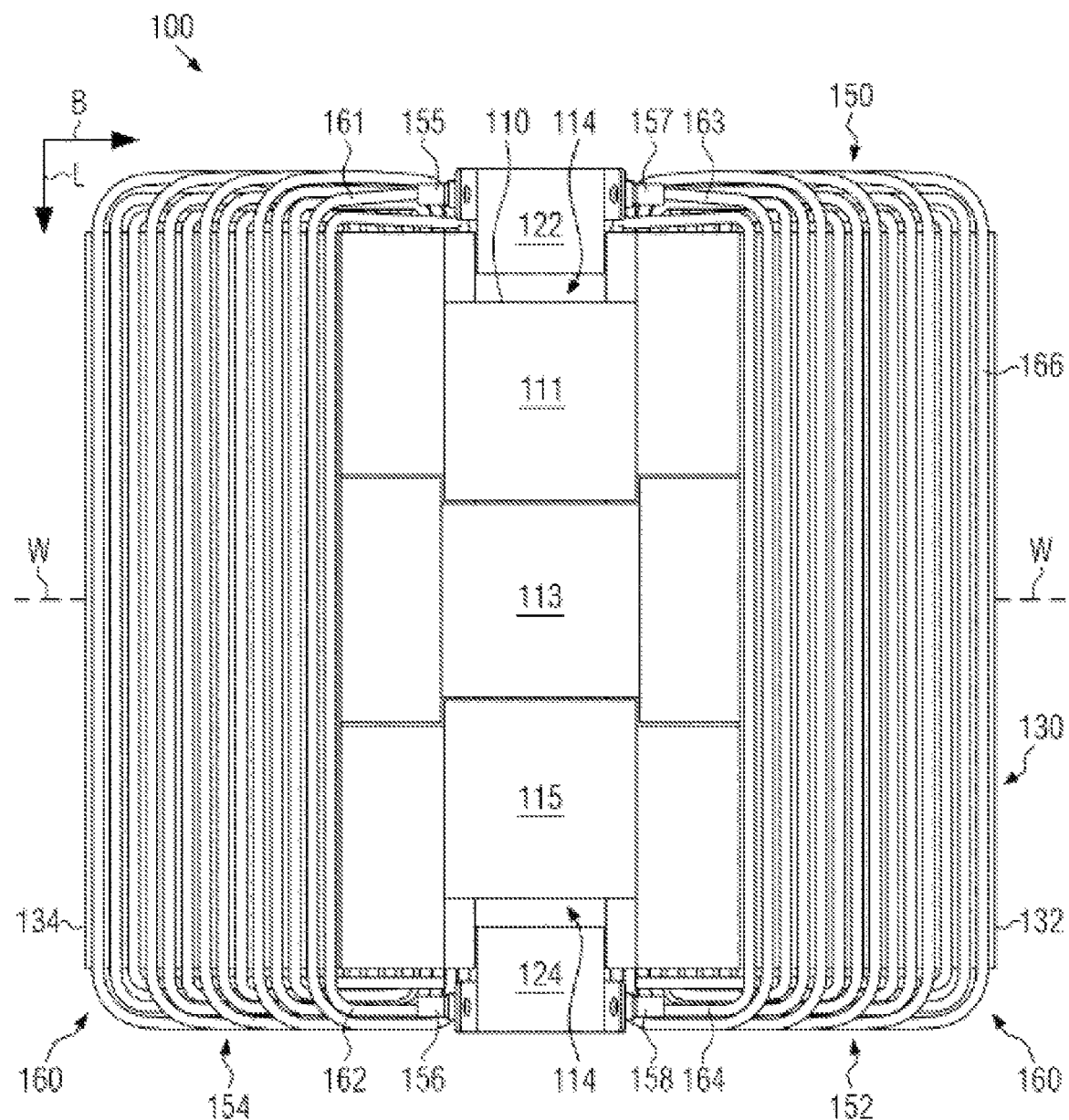
FIG. 3A shows an inductive component for a contactless charging system in accordance with some illustrative embodiments of the present disclosure.

FIG. 3A shows a top view onto an upper side of inductive component 100. The term "upper side" shall below refer to the side of inductive component 100 which is arranged oriented opposite to a "bottom side" of inductive component 100, which in turn is oriented toward a further inductive component (not shown) in a system for contactless charging of an electric vehicle (not shown).

In an illustrative example, inductive component 100 can be attached to an electric vehicle (not shown). Furthermore, inductive component 100 can there be attached such that the upper side is oriented toward a vehicle underbody, while the bottom side is oriented toward a ground (not shown), such as a pavement, a parking lot floor, a garage floor, etc.

In another illustrative example, inductive component 100 can be disposed on or in the ground (not shown), such as a pavement, a parking lot floor, a garage floor, etc., for example embedded therein. The bottom side would there be oriented toward a vehicle underbody (not shown) of an electric vehicle (not shown).

Inductive component 100 comprises a plate-shaped ferrite core 110 and a hybrid double-D solenoid coil 150 which is arranged above plate-shaped ferrite core 110 and has a plurality of turns 160. Plurality of turns 160 is there formed from multiple turns (i.e., at least four turns). A turn is designated in FIG. 3A by way of example with reference character 166. Accordingly, reference character "166" represents a single turn of plurality of turns 160 according to one illustrative and non-restricting example of turn 166.

Plurality of turns 160 is grouped into a plurality of groups, each composed of several immediately consecutive turns, in a manner to be further discussed in greater detail below.

As shown in FIG. 3A, plate-shaped ferrite core 110 is formed from several individual ferrite plates 111, 113, 115 which are joined together to form plate-shaped ferrite core 110. Alternatively, plate-shaped ferrite core 110 can be formed integrally, in particular from a single plate-shaped ferrite element, in which case no joints are present in plate-shaped ferrite core 110, contrary to the illustration in FIG. 3A.

According to several illustrative embodiments, as illustrated in FIG. 3A by way of example, plate-shaped ferrite core 110 can comprise lateral recesses 114 into which, e.g., terminals 122, 124 of the inductive component are received in a space-saving manner, where the lateral dimensions of the inductive component are kept small. Additionally or alternatively, capacitive components (not shown), such as at least one capacitor, can be received in recesses 114.

Figure 3B:
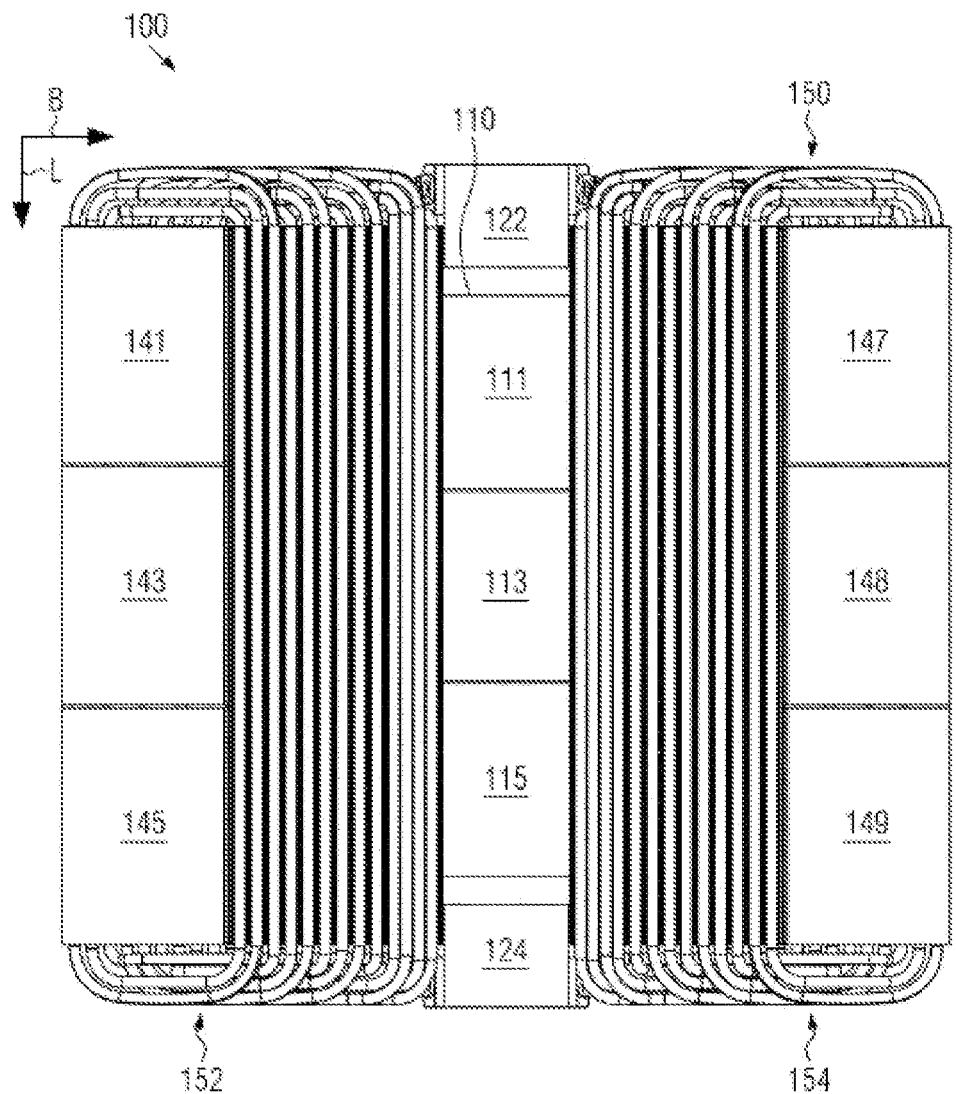
FIG. 3B shows a bottom side view of the inductive component from FIG. 3A.

As illustrated in FIG. 3A by way of example, recesses 114 are provided according to exemplary embodiments as tapered sections of ferrite core 110, where a lateral dimension of ferrite core 110 in recesses 114 is smaller than a lateral dimension of ferrite core 110 outside recesses 114 in relation to a longitudinal direction of ferrite core 110, which is designated in terms of FIGS. 3A and 3B with reference character L. A direction perpendicular to longitudinal direction L is referred to as the width direction and is designated in FIGS. 3A to 3D with reference character B.

According to illustrative embodiments of the present disclosure, the following can be true for the dimensions in longitudinal direction L and width direction B: L>B, L≈B or L<B.

Figure 3C:
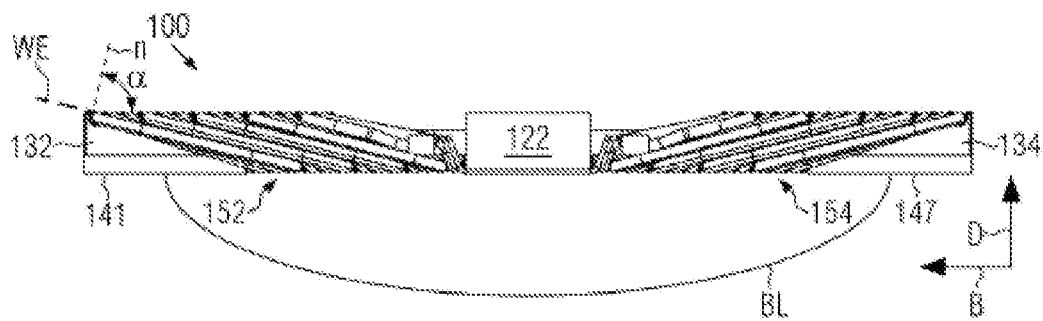
FIG. 3C shows an inner side sectional view of the inductive component shown in FIGS. 3A and 3B.
Figure 3D:
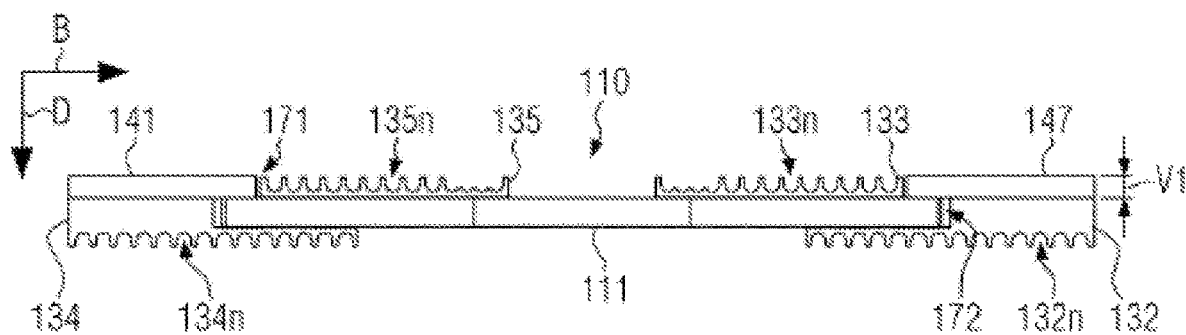
FIG. 3D shows a side sectional view of the ferrite core with the winding body for FIGS. 3A to 3C.

A direction perpendicular to directions L, B is referred to in FIGS. 3C and 3D as thickness direction D. With respect to thickness direction D, ferrite core 110 has dimensions that are smaller than the dimensions along directions L and B: D<L, B.

According to specific exemplary embodiments, it can be true that: D<L/10 and/or D<B/10. According to preferred embodiments, D<L/20 and/or D<B/20. According to specific present illustrative examples, it can be true that: D<L/30 and/or D<B/30. The resulting aspect ratios with respect to D and L, B clearly identify ferrite core 110 as a "plate-shaped ferrite core", and a direction along a thickness is identified as a direction along which the "plate-shaped ferrite core" has the smallest extension, without recesses, e.g., recesses 114, being taken into account.

According to illustrative embodiments, hybrid double-D solenoid coil 150 comprises a first winding 152 and a second winding 154, each comprising a plurality of (in particular two or three or more) turns. In the top view onto the upper side of inductive component 100 shown in FIG. 3A, first winding 152 is arranged with respect to width direction B on an end of plate-shaped ferrite core 110 that is disposed opposite to second winding 154, or turn sections of the plurality of turns of first winding 152 (for example, turn 166 in FIG. 3A) extend over at least the largest part of plate-shaped ferrite core 110 substantially parallel to longitudinal direction L, respectively. FIG. 3A presently shows the special case that the turn sections extend over plate-shaped ferrite core 110 of first winding 152 parallel to longitudinal direction L as long as the turn sections of first winding 152 in the view shown in FIG. 3A extend directly over plate-shaped ferrite core 110, while turn sections to the side of plate-shaped ferrite core 110 have an arcuate profile and, with regard to the view shown in FIG. 3A, are run behind plate-shaped ferrite core 110 toward the bottom side of inductive component 100. The same applies to second winding 154. However, this does not constitute any restriction and a different orientation of the turn sections can be implemented, e.g., at an angle to longitudinal direction L.

First winding 152 is electrically and mechanically connected to terminals 122, 124 of the inductive component by way of terminal contacts 157, 158, where terminal contacts 157 and 158 are connected via respective lead sections 163 and 164 to the plurality of turns of first winding 152. Terminal contacts 157, 158 and terminals 122, 124 can be electrically and mechanically connected to each other by any measure, for example, by way of a crimp connection, screw connection, plug connection, solder connection, and the like. Accordingly, second winding 154 is connected to terminals 122, 124 by way of terminal contacts 155, 156, where terminal contact 155 is connected to the plurality of turns of first winding 154 by way of lead section 161, and terminal contact 156 is connected to the plurality of turns of second winding 154 by way of lead section 162.

Lead sections 161, 162, 163, 164 extend substantially parallel to width direction B at the side of plate-shaped ferrite core 110 and run disposed on the inside according to illustrative embodiments, where lead sections 161, 162, 163, 164 according to illustrative embodiments run along longitudinal direction L at a smaller distance to the side surfaces of plate-shaped ferrite core 110 than the most distant turn sections of the plurality of turns of first and second windings 152, 154. Alternatively, lead sections 161, 162, 163, 164 can be arranged at a greater distance from plate-shaped ferrite core 110 than the outermost turn sections of the plurality of turns of first and second windings 152, 154, whereby lead sections 161-164 are now provided as external lead sections. In the latter case (not shown), lead sections 161-164 are not overlaid by turn sections of the plurality of turns of first and second windings 152, 154.

With reference to FIG. 3B, a top view onto a bottom side of inductive component 100 is illustrated contrary to the top view onto the upper side according to the illustration in FIG. 3A. When comparing FIGS. 3A and 3B, it arises that turn sections of the turns of first and second windings 152, 154, which in the illustrated top views of FIGS. 3A and 3B run directly over plate-shaped ferrite core 110, due to an angled position of the turns of first and second windings in 152, 154 in the case of the upper side in FIG. 3A can be arranged relative to width direction B, for example, at a greater distance from each other than in the case of the view in FIG. 3B showing the bottom side, in which the turn sections of the turns of first and second windings 152, 154 run along width direction B, e.g., at a small distance as compared to FIG. 3B, so that pole sections 141, 143, 145 of plate-shaped ferrite core 110 are formed toward one end of plate-shaped ferrite core 110 in width direction B and with regard to width direction B at the opposite end as exposed pole sections 147, 148 and 149, while in the top view onto the upper side in FIG. 3A, only plate-shaped ferrite core 110 is exposed at connecting sections 111, 113, 115 disposed therebetween which are arranged as shown in FIG. 3B between pole sections 141, 143, 145 and 147, 148, 149.

With reference to FIG. 3C, a side view of inductive component 100 from FIGS. 3A and 3B is shown which arises, for example, from FIG. 3B in that inductive component 100 shown in FIG. 3B is tilted upright out of the illustrated paper plane, so that terminal 122 is viewed perpendicularly from the side. The angled position of the turns of first and second windings 152, 154 with respect to width direction B can be seen in the side view shown in FIG. 3C, i.e., that a normal to a plane formed by a turn of first winding 152 is oriented at an oblique angle to width direction B, as indicated by a schematic winding plane WE in FIG. 3C with respect to a normal designated by n, where an angle α denotes an angle between normal n and width direction B. Angle α is unequal to 0° and, according to specific illustrative embodiments, e.g., is greater than or equal to 5° (α>5°), without this restricting the present disclosure. The same applies to second winding 154, where the first winding and the second winding can be wound mirror-symmetrically with respect to an axis of symmetry oriented parallel to thickness direction D between the first and the second winding.

According to illustrative embodiments, as shown in FIGS. 3A to 3C, inductive component 100 comprises a winding element 130 having a first support member 132 configured to receive and support first winding 152 and a second support member 134 configured to receive and support the second winding. Support members 132 can have, for example, an elongated plate-like shape that at least in part covers ferrite core 110 along longitudinal direction L and is formed from electrically insulating material such as by injection molding or the like.

With regard to FIG. 3D, plate-shaped ferrite core 110 from the illustration in FIG. 3C is shown in FIG. 3C without terminal 122 and first and second winding 152, 154 with terminal contacts. According to the illustration in FIG. 3D, in particular only plate-shaped ferrite core 110 and winding element 130 are shown in a side view.

According to illustrative examples of the present disclosure, as illustratively shown in FIG. 3D, plate-shaped ferrite core 110 comprises a first step 171 and a second step 172. According to step 171, an exposed surface of pole section 141 is disposed offset relative to connecting section 111 along thickness direction D, i.e., an offset V1 is formed by step 171 between an alike oriented surface of connecting section 111 relative to the exposed pole surface of pole section 141. Accordingly, pole section 147 is offset relative to connecting section 111 by step 172, the offset is in particular formed between the exposed pole surface of pole section 147 and the alike oriented surface of connecting section 111. This is no restriction of the present disclosure and only one of steps 171, 172 can be formed instead of two steps 171, 172. Alternatively, steps 171 and 172 can be formed such that an offset associated with step 171 is unlike to an offset associated with second step 172.

According to the exemplary illustration in FIG. 3D, winding element 130 comprises support members 132, 133, 134, 135, where support members 133, 135 are formed next to corresponding steps 171, 172, so that they in part overlay connecting section 111, while pole section 141 or pole section 147, respectively, is not overlaid by support member 135 or 133, respectively. On the other hand, support members 132, 134 are formed such that steps 171, 172 are overlaid by support members 132, 134 on the upper side of plate-shaped ferrite core 110.

Support member 132 comprises a plurality of grooves 132n corresponding to the number of turns of the second winding, as shown in FIG. 3C. Support member 133 comprises a plurality of grooves 133n according to the number of turns of second winding 154 and corresponding to the number of grooves 132n of support member 132. The same applies for support members 135 and 134 with regard to first winding 152 from the illustration in FIG. 3C.

Grooves 132n, 133n, 134n, and 135n each receive a turn section of a turn over the upper side or bottom side of plate-shaped ferrite core 110, respectively, and insulate adjacent turn sections from each other respectively along the upper side or bottom side of plate-shaped ferrite core 110 from each other, so that short-circuiting of the turns can be prevented if e.g., a sheathing for the turn sections is dispensed with. In addition, support members 132, 133, 134, 135 contribute to the mechanical fixation and stabilization of first and second windings 152, 154.

FIG. 3D shows an exemplary embodiment of winding element 130 in which some grooves of support members 133, 135 are less deep or have partition walls of a lower height. These exemplary embodiments serve merely to illustrate configuration options of support members 133, 135 in terms of installation space and do not constitute any restriction of the present disclosure. Alternatively, the grooves of support member 133 and/or 135 can be as uniform as possible (i.e., with as uniform a depth as possible or uniformly high partition walls, where "as possible" means a tolerable deviation from the ideal case in the range of manufacturing tolerances, e.g., deviations of about 5% or about 10% from a predetermined size).

Figure 1C:
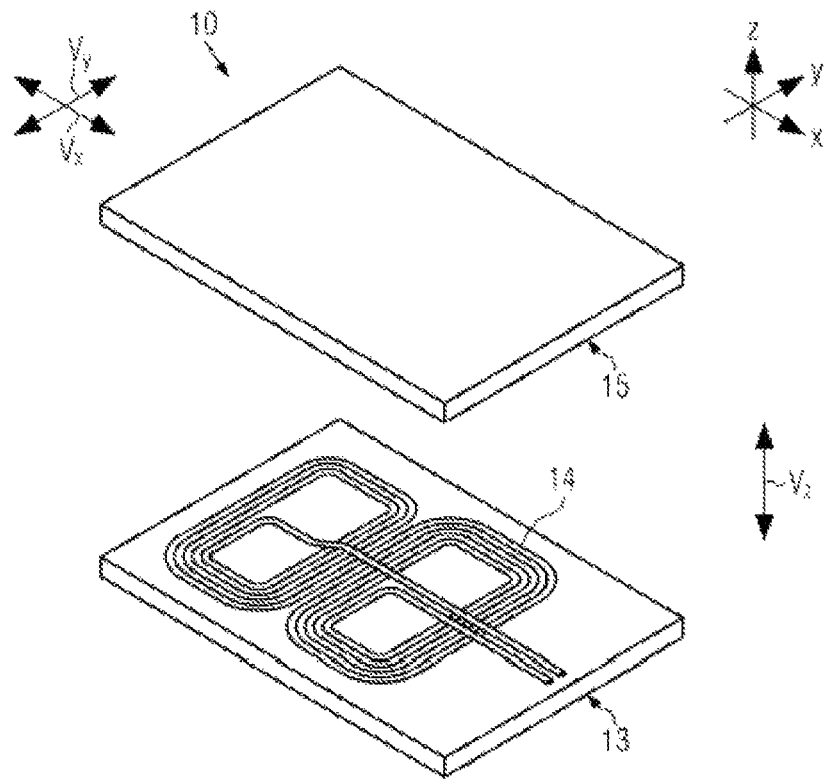
FIG. 1C schematically shows a known system for contactless charging of an electric car.
Figure 1D:
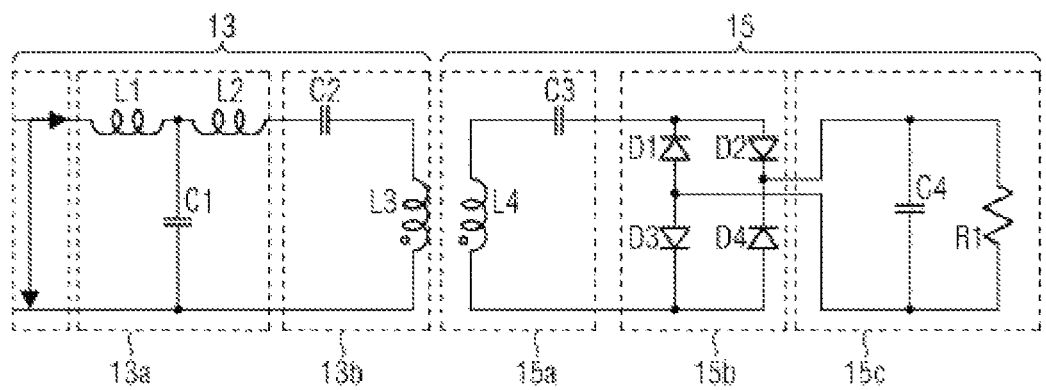
FIG. 1D schematically shows a circuit diagram of the system for contactless charging of an electric car from FIG. 1C.
Figure 1E:
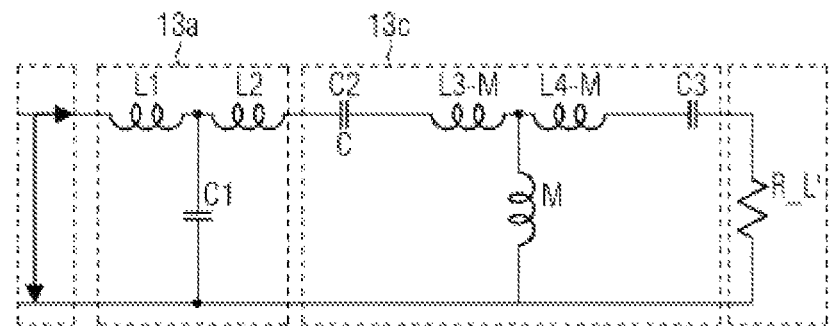
FIG. 1E shows a simplified equivalent circuit diagram of the circuit diagram from FIG. 1D.
Figure 1F:
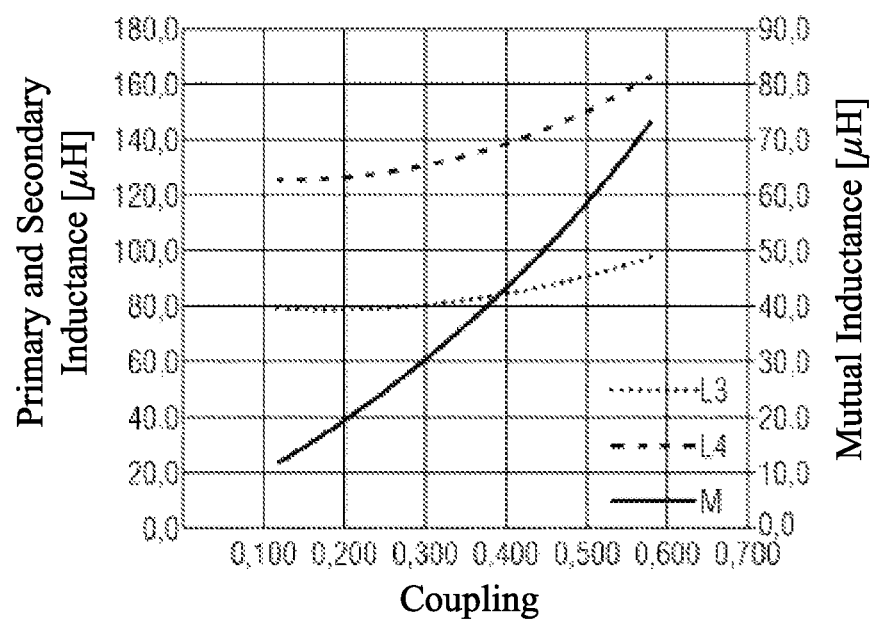
FIG. 1F graphically shows results of a comparison measurement.

A connection configuration of first and second winding 152, 154 to terminals 122, 124 of inductive component 100 shall be described with reference to FIG. 3C. First winding 152 is in this case electrically connected by way of terminal contacts 157, 158 to terminals 122, 124 (cf. FIG. 3A with regard to the terminal contacts of first winding 152) and second winding 154 is electrically connected by way of terminal contacts 155, 156 to terminals 122, 124 of inductive component 100. When a voltage is applied to terminals 122, 124 of inductive component 100 in first winding 152 and in second winding 154, an electrical current is caused during operation which flows through first winding 152 according to the turn direction of first winding 152 in a first direction of rotation, while the flow through second winding 154 is according to the turn direction of second winding 154 in a second direction of rotation, where the first direction of rotation and the second direction of rotation are oriented opposite to each other. This results in a magnetic field, as shown by a schematically drawn B field line BL in FIG. 3C. Specifically, B field line BL exits one of pole sections 141, 147 and enters the other of pole sections 141, 147, as determined by the orientation of the electrical current in first and second windings 152, 154. In plate-shaped ferrite core 110, the back iron of B field line BL is between pole sections 141, 147 of inductive component 100, which is described according to FIGS. 3A to 3D. Inductive component 100 therefore exhibits a good coupling property to a further inductive component, not shown, where it is insensitive to lateral offsets of two inductive components relative to each other as compared to a coil design according to the known coil design, as shown in FIG. 1A, and exhibits an advantageous coupling behavior as compared to the coil design in FIGS. 1B and 1C.

A charging system 300 for contactless charging of an electric vehicle 312 shall now be described with reference to FIG. 4. System 300 100 can represent another illustrative embodiment for a contactless energy transmission system according to the disclosure.

Figure 4:
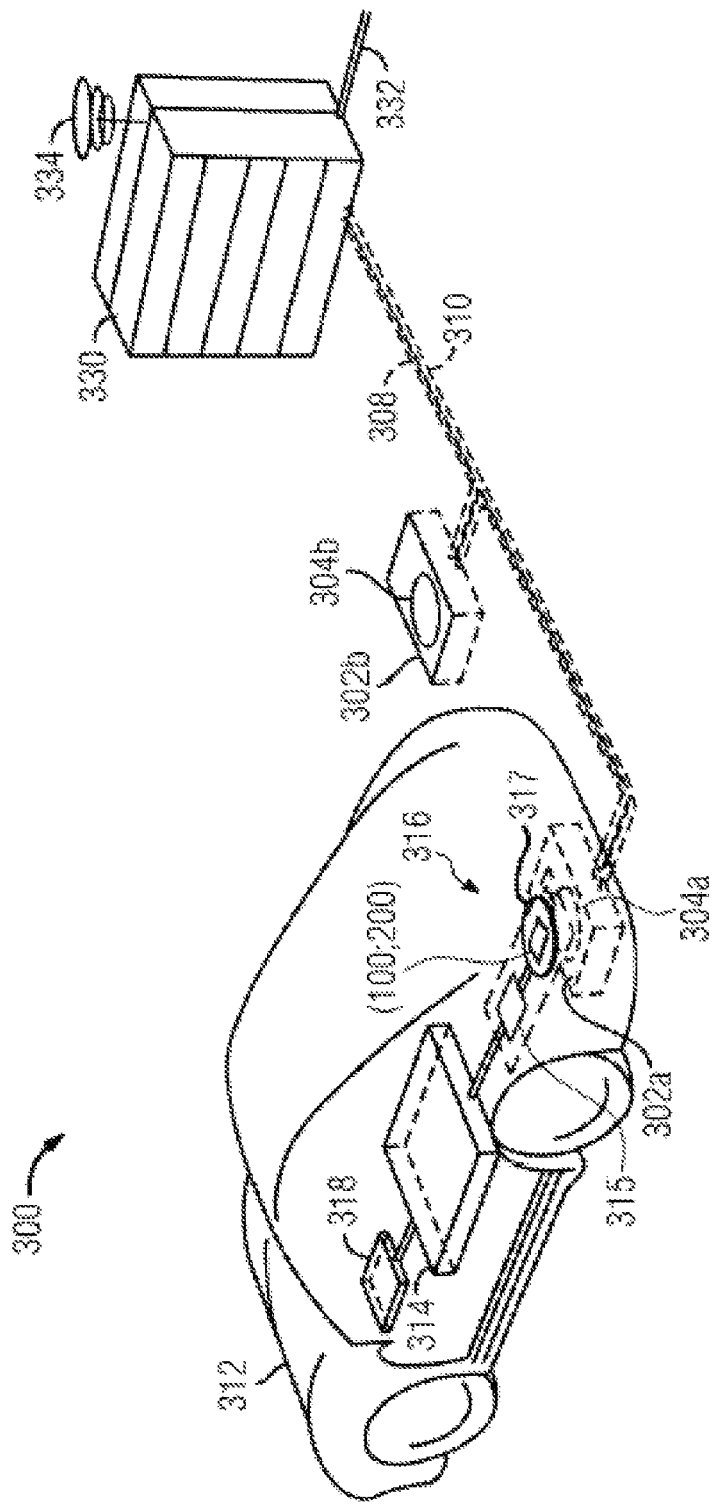
FIG. 4 schematically shows a system for contactless charging of an electric vehicle according to illustrative embodiments of the disclosure.

According to the illustration in FIG. 4, primary resonator devices 302a and 302b with inductive components 304a, 304b on the primary side are provided in charging system 300 and can be positioned, for example, in a parking lot or in a garage and embedded into the ground. Primary resonator devices 302a, 302b are connected via respective connecting lines 308, 310 to a power distribution device 330, which in turn is connected via a line 332 to the power grid, and themselves provide elements of a primary charging system for charging electric vehicle 312. Power distribution device 330 can comprise, for example, a communication unit 334 that can be in communication with one or more external control units (not shown). According to some illustrative examples herein, primary resonator device 302a can be provided by inductive component 100 which is described with reference to FIGS. 3A to 3D above.

An energy storage device 318 on the vehicle side is provided in electric vehicle 312, for example, a rechargeable battery or a rechargeable system composed of rechargeable battery cells, which is connected via a charge controller 314 to a secondary resonator device 316, in particular a drive battery or traction battery. As those skilled in the art will understand, the controller 314 as well as any other unit, system, device, or the like described herein may individually, collectively, or in any combination comprise appropriate circuitry, such as one or more appropriately programmed processors (e.g., one or more microprocessors including central processing units (CPU)) and associated memory, which may include stored operating system software, firmware, and/or application software executable by the processor(s) for controlling operation thereof and for performing the particular algorithm or algorithms represented by the various methods, functions and/or operations described herein, including interaction between and/or cooperation with each other. In contrast to energy storages for the onboard electronics of an electric vehicle, which are operated in the 12 or 48 volt vehicle electrical system, drive batteries in electric vehicles have a voltage of several hundred volts DC, for example, in a range above 300 V, so that requirements for energy storage device 318 and the performance of energy storage device 318 compared to other energy storage devices are many times higher.

Secondary resonator device 316 can comprise, for example, a housing 317 in which an inductive component is housed, as described above with regard to FIGS. 3A to 3B (compare inductive components 100; 200), and it can be provided as an element of a secondary charging system for charging electric vehicle 312. Housing 317 can be formed, for example, on the underbody of electric vehicle 312 for mechanical installation on electric vehicle 312. Secondary resonator device 316 can further comprise a capacitive component 315 which, together with the inductive component, forms an electromagnetic resonator circuit. According to some illustrative examples herein, secondary resonator device 316 can be provided by inductive component 100 described with reference to FIGS. 3A to 3D above.

In some illustrative embodiments of the present disclosure, primary resonator device 302a on the ground side can comprise a coil structure with two windings connected in parallel, each of which has 13 turns. Secondary resonator device 316 on the vehicle side can represent a resonator device with a structure that is identical to primary resonator device 302a or a structure that is similar thereto, with 17.5 turns and a smaller ferrite volume in the core.

While there is currently no established standard that defines the framework conditions of a contactless energy transmission system, industry-wide specifications have been established that define acceptable criteria for interoperability, electromagnetic compatibility, EMF, minimum power, safety and testing for wireless charging of light electric and electric plug-in vehicles. On this basis, three vehicle classes, each with a different distance from the ground, the so-called ground clearance or "GC", have been defined and the permitted offset between the primary and the secondary resonator devices has furthermore been defined. The distance GC can vary between 100 and 250 mm and the permissible offset can be in a range from 0/0 (x-direction/y-direction) to ±75/±100 mm.

When parking electric vehicle 312 over one of primary resonator devices 302a, 302b, a charging process can be initiated, for example, by a communication between charge controller 314 and power distribution device 330 via communication device 334, where the primary resonator device is operated over which the electric vehicle 312 has been parked, in the example of FIG. 4, primary resonator device 302a. By way of near-field transmission, an inductive coupling between primary resonator device 302a and secondary resonator device 316 is established which receives electromagnetic energy from primary resonator device 302a and charges energy storage 318 by way of charge controller 314 (for example, comprising suitable rectifier circuitry). A state of charge of energy storage 318 can there be monitored by charge controller 314, and the charging process can be terminated by communication with power distribution device 330 when a desired state of charge has been reached. Charging system 300 can be configured to detect the presence of an object or living being between secondary resonator device 316 and primary resonator device 302a or 302b, respectively, and, accordingly, the charging process can be interrupted upon detection of a positive event ("object or living being on the primary resonator device or too close to it").

If an offset occurs when electric vehicle 312 is parked as compared to an arrangement with optimal coupling, then the framework conditions of the system change due to the offset between the primary and the secondary resonator device, as was explained above with regard to FIGS. 1C to 1F. For example, the inductances of the primary and the secondary resonator device decrease with increasing offset, as does magnetic coupling k and mutual inductance M.

Figure 5:
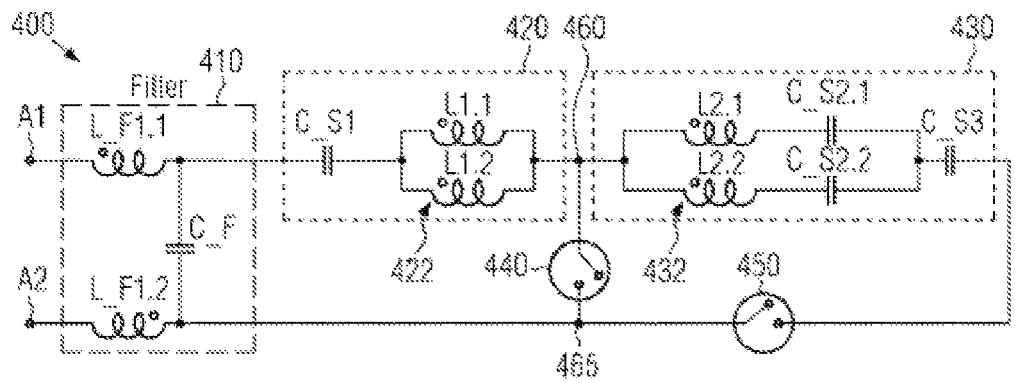
FIG. 5 shows a schematic circuit diagram of a resonator circuit for a contactless energy transmission system in accordance with illustrative embodiments of the disclosure.

A schematic circuit diagram of a resonator circuit 400 for a contactless energy transmission system for charging an electric vehicle (not shown) is presented with reference to FIG. 5 in accordance with illustrative embodiments of the disclosure. The schematic circuit diagram of resonator circuit 400 comprises two terminals A1 and A2 which can be connected to a supply circuit (not shown) for supplying energy to the contactless energy transmission system or to a rectifier circuit (not shown). An input filter device 410 with inductances L_F1.1 and L_F1.2 as well as a capacitor C_F are connected downstream of terminals A1 and A2. Furthermore, a plurality of windings is provided which according to the illustration in FIG. 5 is provided by a first group 422 of windings and a second group 432 of windings. Furthermore, a plurality of capacitors is provided, such as a capacitor C_S1 associated with first group 422 of windings and a capacitor C_S3 associated with second group 432 of windings. In illustrative examples, capacitor C_S1 is connected in series to first group 422 of windings and capacitor C_S3 is connected in series to second group 432 of windings. The schematic circuit diagram of resonator circuit 400 further comprises two switching elements 440 and 450. Disposed between first group 422 of windings and second group 432 of windings is a connection node 460 which is connected via switching element 440 to terminal A2, and connection node 460 is connected via first group 422 of windings to terminal A1. Furthermore, switching element 450 is arranged between second group 432 of windings and terminal A2 and both switching elements 440 and 450 are connected to one another in a star-shaped manner at a connection node 465 so that the connection node is arranged in star-shaped manner between switching elements 440 and 450 and terminal A2. In other words, leads are formed as legs or rays emanating from connection node 465 and are respectively connected to switching elements 440 and 450 and terminal A2. According to the embodiment illustrated, only switching element 440 and switching element 450 are provided, thereby avoiding complication of the circuit. Connection node 465 is arranged between switching elements 440 and 450 and each of switching elements 440 and 450 is connected via connection node 465 to terminal A2. In particular, connection node 465 is formed in a star-shaped manner, where leads are formed as legs or rays emanating from connection node 465 and are each connected to switching elements 440 and 450 and terminal A2.

In some illustrative examples herein, two switching elements 440, 450 are configured such that switching element 450 is open as long as switching element 440 is closed. In this case, switching element 450 is only closed when switching element 440 is open. A configuration of switching elements 440, 450 is thereby defined in these illustrative examples.

According to some illustrative embodiments, the plurality of windings comprising first group 422 of windings and second group 432 of windings is provided as a hybrid double-D solenoid coil over a plate-shaped ferrite core (not shown), as described above with regard to FIG. 2 and FIGS. 3A to 3D. A coil structure based on a hybrid double-D solenoid coil allows for a relatively large coupling with a large distance and/or offset of the primary and the secondary resonator devices relative to one another.

With reference to the illustration in FIG. 5, first group 422 of windings can be formed from two electrically identical winding packages L1.1 and L1.2 connected in parallel. In this case, the current carrying capacity of the first group of windings can be increased and the current and voltage values of winding packages L1.1 and L1.2 connected in parallel are identical in electrically identical winding packages so that equalizing currents between the winding packages connected in parallel are prevented. By using winding packages connected in parallel.

As is furthermore shown in FIG. 5, second group 432 of windings can additionally or alternatively be formed from two electrically identical winding packages L2.1 and L2.2 connected in parallel. The use of winding packages L2.1 and L2.2 connected in parallel allows induced voltages in unused turns of windings of the second group of windings that are switched off to be eliminated in part or entirely when switching element 450 is open. The use of winding packages L2.1 and L2.2 connected in parallel can then also increase the current-carrying capacity of second group of windings 432. According to some illustrative examples herein, each of winding packages L2.1 and L2.2 of the second group 432 of windings connected in parallel can be connected in series with an associated additional capacitor C_S2.1 and C_S2.2. For example, additional capacitors C_S2.1 and C_S2.2 associated with winding packages L2.1 and L2.2 of second group 432 of windings can be configured such that the interconnection of parallel winding packages L2.1 and L2.2 of second group 432 to associated additional capacitors C_S2.1 and C_S2.2 has a resonance frequency that is greater than an operating frequency of the contactless energy transmission system, while a resonance frequency of resonator circuit 400 for a series connection of first and second groups 422, 432 of windings with associated capacitors C_S1, C_S2.1, C_S2.2 and C_S3 has a resonance frequency which is substantially equal to the operating frequency of the contactless energy transmission system. The term "substantially" presently denotes a deviation of less than 30%, preferably less than 15%, more preferably less than 10%, such as less than 5% or even less than 1%. What is thus achieved is that the impedance of the switched-off turns of second group 432 of windings is high and equalization currents are suppressed. When second switching element 450 is now open, the parallel connection of winding packages L2.1 and L2.2 of second group 432 of windings turns into a series connection in which winding packages L2.1 and L2.2 of second group 432 of windings are switched anti-parallel to one another. This ensures that the voltages respectively induced in the turns of second group 432 of windings cancel out.

In each operating mode of resonator circuit 400, it can be achieved that resonator circuit 400 is kept in resonance at the operating frequency of the contactless energy transmission system. For example, the operating frequency of the contactless energy transmission system can be in a range from 80 to 90 kHz in which good energy transmission efficiency can be obtained. According to further examples, the resonance frequency of the interconnection of parallel winding packages L2.1 and L2.2 of second group 432 of windings with associated additional capacitors C_S2.1 and C_S2.2 in additional to capacitor C_S3 can be greater than 90 kHz so that the resonance frequency of the interconnection of parallel winding packages L2.1 and L2.2 of second group 432 of windings to associated additional capacitors C_S2.1 and C_S2.2 is sufficiently distant from the operating frequency of the contactless energy transmission system.

In some illustrative embodiments of the present disclosure, first group 422 of windings can have a first number of turns from a range of 5 to 20 turns and second group 432 of windings can have a second number of turns from a range of 1 to 10 turns. Where the first number of turns can be greater than the second number of turns. This enables a compact resonator circuit with advantageous energy transmission efficiency.

In illustrative examples, the first number of turns can be in a range from 7 to 12 turns, such as 8 or 9 or 10 or 11 turns. The second number of turns can be in a range from 2 to 6 turns, such as 3 or 4 or 5 turns. However, this does not constitute a restriction of the disclosure and any numbers for the first and the second number of turns can be considered.

In some illustrative embodiments herein, resonator circuit 400 can be a primary resonator device in a primary charging system (not shown) for charging an electric vehicle (not shown), thereby providing an advantageous primary resonator device, or a secondary resonator device in a secondary charging system (not shown) for charging an electric vehicle (not shown).

Resonator circuit 400 from FIG. 5 allows, for example, a number of turns of the plurality of windings of the resonator circuit to be changed during operation, for example, to be reduced or increased, depending on whether switching element 440 is closed and switching element 450 is opened, for reducing the number of turns, or switching element 440 is opened and switching element 450 is closed for increasing the number of turns.

With respect to input filter 410, an LC filter arrangement with a coupled choke is disposed is in both supply lines between terminals A1 and A2 and groups 422 and 432 of windings.

With regard to first group 422 of windings, it is compensated by associated capacitor C_S1 (e.g., connected in series).

With regard to second group 432 of windings, one capacitor C_S3 is presently associated. Furthermore, according to the illustration in FIG. 5, capacitors C_S2.1 and C_S2.2 are additionally provided so that second group of windings 432 with parallel winding packages L2.1 and L2.2 is compensated by three capacitors C_S2.1, C_S2.2 and C_S3.

In an operating mode in which all turns of the plurality of windings are used, switching element 440 is open and switching element 450 is closed. In this case, winding packages L2.1 and L2.2 are parallel and are compensated by the combination of capacitors C_S2.1, C_S2.2 and C_S3. The capacitances of capacitors C_S2.1 and C_S2.2 add up as a parallel connection of capacitors. Overall, the capacitors are designed such that the system behaves resonantly at the operating frequency (e.g., at 85 kHz).

In an operating mode in which the number of turns is to be reduced relative to the operating mode described above, switching element 440 is closed and switching element 450 is open. This bypasses second group 432 of windings together with the associated capacitors. By opening switching element 450, the parallel connection of winding packages L2.1 and L2.2 of second group 432 of windings turns into a series connection and the induced voltages of winding packages L2.1 and L2.2 cancel each other out. Capacitors C_S2.1 and C_S2.2 are provided such that the resonance of second group 432 of windings in this operating mode is now far distant from the operating frequency. As a result, there is a high impedance acting and only very small equalizing currents can flow. As shown in FIG. 5, the disconnected turns of second group 432 of windings continue to be connected to the circuit at connection point 460 in this operating mode, as a result of which they have a defined potential and damage caused by potential differences is prevented.

Although illustrative embodiments are described with reference to FIG. 5 in which connection node 460 is shown in a star-shaped manner with 3 legs, this does not constitute any restriction of the disclosure. In alternative embodiments (not shown), connection node 460 can be shown in a star-shaped manner having more than three legs or rays, where three legs or rays are formed as shown in FIG. 5, while each additional leg or ray with respect to these three legs or rays emanating from the star-shaped connection node, goes from the connection node to an inductance with a certain number of turns and is subsequently connected to this inductance via an additional switching element (not shown) to a connection node which corresponds to connection node 465 in FIG. 5. It is therefore possible to successively set a different number of windings by selectively switching inductances on or off. In addition or as an alternative, several inductances can be connected in parallel with one another in order to provide an efficient inductance for the circuit formed from the inductances connected in parallel. This allows for finer adjustment of the inductance of the circuit.

In these illustrative embodiments not illustrated, a contactless energy transmission system for charging electric vehicles is provided with a resonator circuit that comprises a first and a second terminal, a plurality of windings, a plurality of capacitors, a first switching element and a second switching element, where the resonator circuit can be connected via the first and the second terminal to a supply circuit or a rectifier, where the plurality of windings is divided into a first group of windings and a second group of windings and at least a third group of windings, where each group of windings is associated with at least one capacitor of the plurality of capacitors which is connected in series to the associated group of windings, where the resonator circuit further comprises a connection node connecting the first group of windings and the second group of Windings and at least the third group of windings in a star-shaped manner so that the connection node is arranged, firstly, between the first group of windings and the second group of windings and the connection node is connected via the first switching element to the first terminal, secondly, the connection node is arranged between the first group of windings and the third group of windings and is connected via an further (third) switching element associated with the third group of windings to the first terminal, where the connection node is connected via the first group of windings to the second terminal, where the second switching element is arranged between the second group of windings and the first terminal, and where the further switching element associated with the third group of windings is connected to the first terminal. A fourth group of windings with an associated further (fourth) switching element can be provided which is connected to the star-shaped connection node, where the connection node is arranged between the first group of windings and the fourth group of windings and connected via the further (fourth) switching element associated with the fourth group of windings to the first terminal. This can be continued as desired, so that generally n (n>1) groups of windings are provided, where the $n^{th}$ group of windings is associated with an $n^{th}$ switching element and the $n^{th}$ group of windings is connected to the connection node so that the connection node is arranged between the first group of windings and the $n^{th}$ group of windings and is connected via the $n^{th}$ switching element to the first terminal. In any case, however, the connection node is connected via the first group of windings to the second terminal and the connection node is furthermore connected via the first switching element to the first terminal. This describes, for example, that in the case of a star-shaped connection node 460 or 465 with three legs or rays, two legs or rays are formed so that they are each connected to a series circuit section formed by a group of windings and a switching element. This means for a star-shaped connection node with three legs or rays that two legs or rays are each connected to a series circuit section, or generally for a star-shaped connection node with n legs or rays (n−1) legs or rays are each connected to a series circuit section.

Figure 6:
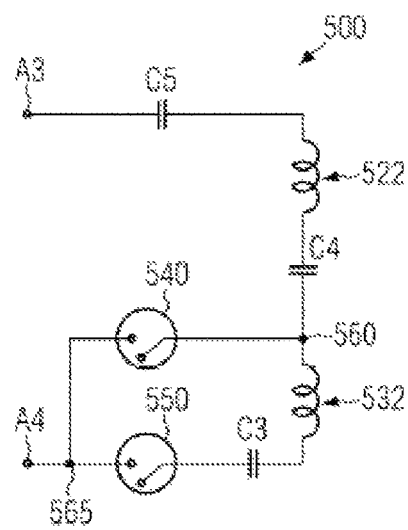
FIG. 6 shows a schematic circuit diagram of a resonator circuit for a contactless energy transmission system in accordance with further illustrative embodiments of the disclosure.

A schematic circuit diagram of a resonator circuit 500 for a contactless energy transmission system is shown with reference to FIG. 6 in accordance with further illustrative embodiments of the disclosure. The schematic circuit diagram of resonator circuit 500 comprises two terminals A3 and A4 which can be connected to a supply circuit (not shown) for supplying energy to the contactless energy transmission system or to a rectifier circuit (not shown).

Similar to resonator circuit 400 from FIG. 5, terminals A3 and A4 can have an input filter device (not shown) be downstream, which can be configured in accordance with input filter device 410 from FIG. 5.

Furthermore, a plurality of windings is provided which according to the illustration in FIG. 6 is provided by a first group 522 of windings and a second group 532 of windings. A plurality of capacitors is furthermore provided such that first group 522 of windings is associated with capacitors C4 and C5 and second group 532 of windings is associated with a capacitor C3. In illustrative examples, capacitors C4 and C5 are connected in series to first group 522 of windings and capacitor C_3 is connected in series to second group 532 of windings.

The schematic circuit diagram of resonator circuit 500 further comprises two switching elements 540 and 550 according to the illustration in FIG. 6. According to the embodiment illustrated, only switching element 440 and switching element 450 are provided, thereby avoiding complication of the circuit. Disposed between first group 522 of windings and second group 532 of windings is a connection node 560 which is connected via switching element 540 to terminal A4. Connection node 560 is furthermore connected via first group 522 of windings to terminal A3 and furthermore, switching element 550 is arranged between second group 532 of windings and terminal A4. Furthermore, a connection node 565, via which each of switching elements 540 and 550 is connected to terminal A4, is arranged between switching elements 540 and 550.

In some illustrative examples herein, two switching elements 540, 550 are configured such that switching element 550 is open as long as switching element 540 is closed. In this case, switching element 550 is only closed when switching element 540 is open. A configuration of switching elements 540, 550 is thereby defined in these illustrative examples.

According to some illustrative embodiments, the plurality of windings comprising first group 522 of windings and second group 532 of windings is provided as a hybrid double-D solenoid coil over a plate-shaped ferrite core (not shown), as described above with regard to FIG. 2 and FIGS. 3A to 3D. A coil structure based on a hybrid double-D solenoid coil allows for a relatively large coupling with a large distance and/or offset of the primary and the secondary resonator devices relative to one another.

In illustrative embodiments of the disclosure, capacitor C3 associated with group 532 of windings is configured such that the connection of group 532 of windings to associated capacitor C3 has a resonance frequency that is greater than an operating frequency of the contactless energy transmission system, while a resonance frequency of resonator circuit 400 for a series connection of first and second group 522, 532 of windings to associated capacitors C3 to C5 has a resonance frequency which is substantially equal to the operating frequency of the contactless energy transmission system. The term "substantially" presently denotes a deviation of less than 30%, preferably less than 15%, more preferably less than 10%, such as less than 5% or even less than 1%. What is thus achieved is that the impedance of the switched-off turns of second group 532 of windings is high and equalization currents are suppressed.

In each operating mode of resonator circuit 500, it can be achieved that resonator circuit 500 is kept in resonance at the operating frequency of the contactless energy transmission system. For example, the operating frequency of the contactless energy transmission system can be in a range from 80 to 90 kHz, in which good energy transmission efficiency can be obtained. According to further examples, the resonance frequency of second group 532 of windings with associated capacitor C3 can be greater than 90 kHz, so that the resonance frequency of the interconnection of second group 532 of windings with associated capacitor C3 is sufficiently distant from the operating frequency of the contactless energy transmission system.

In some illustrative embodiments of the present disclosure, first group 522 of windings can have a first number of turns from a range of 5 to 20 turns and second group 532 of windings can have a second number of turns from a range of 1 to 10 turns. Where the first number of turns can be greater than the second number of turns. This enables a compact resonator circuit with advantageous energy transmission efficiency.

In illustrative examples, the first number of turns can be in a range from 7 to 12 turns, such as 8 or 9 or 10 or 11 turns. The second number of turns can be in a range from 2 to 6 turns, such as 3 or 4 or 5 turns. However, this does not constitute a restriction of the disclosure and any numbers for the first and the second number of turns can be considered.

In some illustrative embodiments herein, resonator circuit 500 can be a primary resonator device in a primary charging system (not shown) for charging an electric vehicle (not shown), thereby providing an advantageous primary resonator device, or a secondary resonator device in a secondary charging system (not shown) for charging an electric vehicle (not shown). Resonator circuit 400 described in the context of FIG. 5 effects an adjustment of the mutual inductance, as shall explained in more detail below, while an adjustment of a resonance frequency does not or does not substantially take place. Regardless of the switching configuration of the switching elements, the windings remain magnetically in the system. The parallel structural design of windings L2.1 and L2.2 can reduce a thermal dissipation loss in windings L2.1 and L2.2, especially if they are "switched off" when switching element 450 is open, as it arises from the above description of FIG. 5.

As shown in FIG. 6, the disconnected turns of second group 532 of windings in the case of an operating mode with an open switching element 550 continue to be connected to the circuit at connection point 560, as a result of which they have a defined potential and damage caused by potential differences is prevented.

Although illustrative embodiments are described with reference to FIG. 5 in which connection node 560 is shown in a star-shaped manner with three legs, this does not constitute any restriction of the disclosure. In alternative embodiments (not shown), connection node 560 can be shown in a star-shaped manner having more than three legs or rays, where three legs or rays are formed as shown in FIG. 5, while each additional leg or ray with respect to these three legs or rays emanating from the star-shaped connection node, goes from the connection node to an inductance with a certain number of turns and is subsequently connected to this inductance via an additional switching element (not shown) with a connection node which corresponds to connection node 565 in FIG. 6. It is therefore possible to successively set a different number of windings by selectively switching inductances on or off. In addition or as an alternative, several inductances can be connected in parallel with one another in order to provide an efficient inductance for the circuit formed from the inductances connected in parallel. This allows for finer adjustment of the inductance of the circuit.

In these illustrative embodiments not illustrated, a contactless energy transmission system for charging electric vehicles is provided with a resonator circuit that comprises a first and a second terminal, a plurality of windings, a plurality of capacitors, a first switching element and a second switching element, where the resonator circuit can be connected via the first and the second terminal to a supply circuit or a rectifier, where the plurality of windings is divided into a first group of windings and a second group of windings and at least a third group of windings, where each group of windings is associated with at least one capacitor of the plurality of capacitors which is connected in series to the associated group of windings, where the resonator circuit further comprises a connection node connecting the first group of windings and the second group of Windings and at least the third group of windings in a star-shaped manner so that the connection node is arranged, firstly, between the first group of windings and the second group of windings and the connection node is connected via the first switching element to the first terminal, secondly, the connection node is arranged between the first group of windings and the third group of windings and is connected via a further (third) switching element associated with the third group of windings to the first terminal, where the connecting node is connected via the first group of windings to the second terminal, where the second switching element is arranged between the second group of windings and the first terminal, and where the further switching element associated with the third group of windings is connected to the first terminal. A fourth group of windings with an associated further (fourth) switching element connected to the star-shaped connection node can also be provided and connected to the star-shaped connection node, where the connection node is arranged between the first group of windings and the fourth group of windings and connected via the further (fourth) switching element associated with the fourth group of windings to the first terminal. This can be continued as desired, so that generally n (n>1) groups of windings are provided, where the $n^{th}$ group of windings is associated with an $n^{th}$ switching element and the $n^{th}$ group of windings is connected to the connection node, so that the connection node is arranged between the first group of windings and the $n^{th}$ group of windings and is connected via the $n^{th}$ switching element to the first terminal. In any case, however, the connection node is connected via the first group of windings to the second terminal and the connection node is also connected via the first switching element to the first terminal. This describes, for example, embodiments in which a star-shaped connection node 560 and/or 565 with three legs or rays, two legs or rays are formed so that they are each connected to a series circuit section formed from a group of windings and a switching element. This means for a star-shaped connection node with three legs or rays that two legs or rays are each connected to a series circuit section, or generally for a star-shaped connection node with n legs or rays, (n−1) legs or rays are each connected to a series circuit section.

Figure 7:
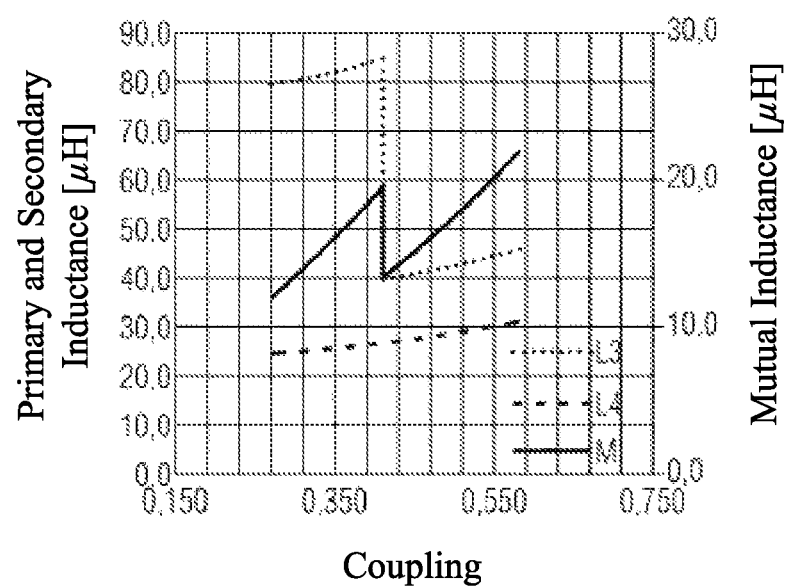
FIG. 7 graphically depicts a relationship between inductances and coupling for a resonator circuit in accordance with illustrative embodiments of the disclosure.

Results of a measurement at a contactless energy transmission system according to an exemplary embodiment of the disclosure are illustrated with reference to FIG. 7. FIG. 7 graphically represents a measured relationship between the inductance of a resonator device (left ordinate in FIG. 7) and the coupling between a primary and a secondary resonator device (abscissa in FIG. 7) and a relationship between the mutual inductance of the resonator device (right ordinate in FIG. 7) and the coupling (abscissa in FIG. 7). It can be seen that the change in mutual inductance M can be limited to a relatively small working range when compared with the comparative example in FIG. 1F.

It can also be seen that, in embodiments (not shown) in which connection node 460 shown in FIG. 5 is formed in a star-shaped manner with more than three legs, a larger number of partitions of windings can be connected and, a mutual inductance M of the circuit can be fine-tuned also with a parallel connection of several inductances. With reference to FIG. 7, this means that the single step shown in FIG. 7 is replaced by several smaller steps, so that changes in mutual inductance M can in this case be limited to an even smaller working range than illustrated in FIG. 7.

In summary, changes in the mutual inductance of a transmission system with a large air gap and changing coupling conditions are compensated with regard to functionally critical variables. In some illustrative embodiments, the additional advantage of a hybrid double-D solenoid coil system with a large achievable coupling in combination with mutual inductance adaptation is used, so that large powers can be transmitted efficiently at all operating points. A circuit structure was provided there that enables a certain number of turns of a resonator circuit to be disconnected without impairing the function of the system or causing significant additional losses and limiting a change in the mutual inductance. In the illustrative embodiments of the disclosure, a coil structure of the coils of resonators for contactless energy transmission is possible in which good efficiency is achieved by way of mutual inductance adaptation despite a large variance in the coupling between the resonators.

The invention claimed is:

1. A resonator circuit for a contactless energy transmission system for charging electric vehicles, said resonator circuit comprising:
    a first terminal;
    a second terminal;
    a plurality of windings;
    a plurality of capacitors;
    a first switching element; and
    a second switching element;
    wherein said resonator circuit is connectable via said first terminal and said second terminal to a supply circuit or a rectifier;
    wherein said plurality of windings is divided into a first group of windings and a second group of windings;
    wherein a first connection node is arranged between two respective ones of said first group of windings, said second group of windings, and said first switching element so that said first connection node is connected via said first switching element to said first terminal and via said first group of windings to said second terminal, where said first connection node is formed in a star-shaped manner; and
    wherein the second switching element is arranged between said second group of windings and said first terminal.

2. The resonator circuit according to claim 1, further comprising a third group of windings and a third switching element connected in series therewith, wherein said third group of windings and said third switching element connected in series therewith are connected in parallel with said second group of windings to said first connection node.

3. The resonator circuit according to claim 1, wherein a second connection node, via which said respective first switching element and said second switching element is connected to said first terminal, is arranged between said first switching element and said second switching element.

4. The resonator circuit according to claim 3, wherein said second connection node is further formed between said first switching element, said second switching element and said first terminal in a star-shaped manner and said third group of windings and said third switching element connected in series therewith are connected between said first connection node and said second connection node in parallel with said second group and said first switching element.

5. The resonator circuit according to claim 3, wherein said second connection node is formed between said first switching element, said second switching element, and said first terminal in a star-shaped manner.

6. The resonator circuit according to claim 5, further comprising a further circuit section with a fourth group of windings and a fourth switching element, wherein said further circuit section is connected in parallel with said second group of windings to said second connection node.

7. The resonator circuit according to claim 6, wherein said second connection node is further formed between said first switching element, said second switching element, and said first terminal in a star-shaped manner and said further circuit section is connected between said first connection node and said second connection node in parallel with said second group and said first switching element.

8. The resonator circuit according to claim 1, wherein said first and second switching elements are configured such that said second switching element is open as long as said first switching element is closed, and said second switching element is closed only when said first switching element is open.

9. The resonator circuit according to claim 1, wherein said plurality of windings is provided as a hybrid double-D solenoid coil over a plate-shaped ferrite core.

10. The resonator circuit according to claim 1, wherein said first group of windings and/or said second group are each formed from two electrically identical winding packages connected in parallel.

11. The resonator according to claim 1, wherein said first group of windings has a first number of turns from a range of 5 to 20 turns and said second group of windings has a second number of turns from a range of 1 to 10 turns, wherein the first number of turns is greater than the second number of turns.

12. A contactless energy transmission system for charging electric vehicles with a primary resonator device and a secondary resonator device, wherein at least one of said primary resonator device and said secondary resonator device comprises a resonator circuit according to claim 1.

13. The contactless energy transmission system according to claim 12, wherein said second group of windings is formed from two electrically identical winding packages connected in parallel and each of said winding packages of said second group of windings connected in parallel is respectively connected in series with an associated additional capacitor, and wherein said additional capacitors associated with said winding packages of said second group of windings is configured such that the interconnection of said parallel winding packages of said second group with said associated additional capacitors has a resonance frequency that is greater than an operating frequency of said contactless energy transmission system, while a resonance frequency of said resonator circuit for a series connection of said first and said second group of windings with said associated capacitors has a resonance frequency which is substantially equal to the operating frequency of said contactless energy transmission system.

14. The contactless energy transmission system according to claim 12, wherein the operating frequency of said contactless energy transmission system is in a range from 80 to 90 kHz.

15. The contactless energy transmission system according to claim 12, wherein the resonance frequency of the interconnection of said parallel winding packages of said second group with said associated additional capacitors is greater than 90 KHz.

16. A resonator circuit for a contactless energy transmission system for charging electric vehicles, said resonator circuit comprising:
- a first terminal;
- a second terminal;
- a plurality of windings;
- a first switching element; and
- a second switching element;
- wherein said plurality of windings is divided into a first group of windings and a second group of windings;
- wherein a first connection node is arranged between two respective ones of said first group of windings, said second group of windings, and said first switching element so that said first connection node is connected via said first switching element to said first terminal and via said first group of windings to said second terminal, where said first connection node is formed in a star-shaped manner; and
- wherein the second switching element is arranged between said second group of windings and said first terminal.

17. The resonator circuit according to claim 16, further comprising a third group of windings and a third switching element connected in series therewith, wherein said third group of windings and said third switching element connected in series therewith are connected in parallel with said second group of windings to said first connection node.

18. The resonator circuit according to claim 16, wherein a second connection node, via which said respective first switching element and said second switching element is connected to said first terminal, is arranged between said first switching element and said second switching element.

19. The resonator circuit according to claim 18, wherein said second connection node is further formed between said first switching element, said second switching element and said first terminal in a star-shaped manner and said third group of windings and said third switching element connected in series therewith are connected between said first connection node and said second connection node in parallel with said second group and said first switching element.

20. A contactless energy transmission system for charging electric vehicles with a primary resonator device and a secondary resonator device, wherein at least one of said primary resonator device and said secondary resonator device comprises a resonator circuit according to claim 16.

* * * * *